United States Patent [19]

Norris

[11] Patent Number: 5,784,386

[45] Date of Patent: Jul. 21, 1998

[54] FAULT TOLERANT SYNCHRONOUS CLOCK DISTRIBUTION

[75] Inventor: Joseph P. Norris, Mt. Laurel, N.J.

[73] Assignee: General Signal Corporation, Stamford, Conn.

[21] Appl. No.: 674,839

[22] Filed: Jul. 3, 1996

[51] Int. Cl.$^6$ .................................................. G06F 11/08
[52] U.S. Cl. ............................................. 371/36; 326/35
[58] Field of Search .............................. 371/36, 61, 62, 371/47.1, 1; 395/556, 558, 555, 551; 375/357, 354; 326/11, 12, 36

[56] References Cited

U.S. PATENT DOCUMENTS

| | | | |
|---|---|---|---|
| 3,283,172 | 11/1966 | Masters, Jr. | 326/35 |
| 3,305,830 | 2/1967 | Constantine, Jr. | 326/35 |
| 3,456,126 | 7/1969 | Kaplan | 326/35 |
| 3,783,250 | 1/1974 | Fletcher et al. | 395/182.09 |
| 3,900,741 | 8/1975 | Fletcher et al. | 326/35 |
| 4,276,645 | 6/1981 | Lager et al. | 371/36 |
| 4,375,683 | 3/1983 | Wensley | 395/182.1 |
| 4,589,066 | 5/1986 | Lam et al. | 371/47.1 |
| 4,644,498 | 2/1987 | Bedard et al. | 395/182.01 |
| 4,683,570 | 7/1987 | Bedard et al. | 371/36 |
| 4,788,670 | 11/1988 | Hofmann et al. | 371/36 |
| 4,829,198 | 5/1989 | Maley et al. | 326/10 |
| 4,839,855 | 6/1989 | Van Driel | 395/558 |
| 4,868,826 | 9/1989 | Smith et al. | 395/182.08 |
| 4,907,232 | 3/1990 | Harper et al. | 371/36 |
| 4,965,717 | 10/1990 | Cutts, Jr. et al. | 395/182.1 |
| 4,979,191 | 12/1990 | Bond et al. | 375/357 |
| 4,984,241 | 1/1991 | Truong | 371/36 |
| 5,084,878 | 1/1992 | Kanekawa et al. | 371/36 |
| 5,117,442 | 5/1992 | Hall | 375/356 |
| 5,157,673 | 10/1992 | Feldbrugge | 371/68.1 |
| 5,349,654 | 9/1994 | Bond et al. | 371/36 |
| 5,377,205 | 12/1994 | Shi | 371/36 |
| 5,377,206 | 12/1994 | Smith | 371/36 |
| 5,379,415 | 1/1995 | Papenberg et al. | 395/182.03 |
| 5,404,363 | 4/1995 | Krause et al. | 371/61 |

*Primary Examiner*—Robert W. Beausoliel, Jr.
*Assistant Examiner*—Trinh L. Tu
*Attorney, Agent, or Firm*—Ohlandt, Greeley, Ruggiero & Perle

[57] ABSTRACT

There is provided a fault tolerant clock system for a synchronous design using N-way combinatorial voting schemes for N greater than 3. The system comprises a plurality of clock circuits for generating clock signals and a voting circuit that is connected to each clock circuit for receiving the clock signals and generating an output signal. The voting circuit produces an output signal that is in agreement with a majority of the clock signals and maintains the output signal at a previous output level when the majority of the clock signals is not detected by the voting circuit. From another viewpoint, the voting circuit maintains the output signal at the previous current level when a minority of agreeing clock signals is not detected by the voting circuit.

2 Claims, 4 Drawing Sheets

FAULT TOLERANT SYNCHRONOUS CLOCK DISTRIBUTION

The present invention relates generally to clock circuits for fault tolerant computer systems. More particularly, the present invention relates to a fault tolerant clock distribution circuit for a synchronous design having a voting circuit for polling a plurality of clock channels and providing a high precision output.

RELATED APPLICATIONS

The invention of this application is related to inventions described in three other applications with reference to the same fault tolerant crosspoint switch that are owned by the assignee of the present invention: U.S. patent application Ser. No. 08/675,165 filed on Jul. 3, 1996 entitled TIME DIVISION SWITCHING SYSTEM (Docket No. 100.0615); U.S. patent application Ser. No. 08/675,503 filed on Jul. 3, 1996 entitled FAULT TOLERANT SWITCH FABRIC WITH CONTROL AND DATA CORRECTION BY HAMMING CODES (Docket No. 100.0616); and U.S. patent application Ser. No. 08/675,491 filed on Jul. 3, 1996 entitled FAULT TOLERANT SWITCH FABRIC WITH CONTROL AND DATA CORRECTION BY HAMMING CODES WITH ERROR INDUCING CHECK REGISTER (Docket No. 100.0617).

BACKGROUND OF THE INVENTION

High precision electronic systems, such as computer systems, rely on precise timing in order to operate properly and provide accurate results. Any computational errors by the system may cause significant disruption in its operation and the accuracy of its output. Since errors do occur, these computing systems often have fault tolerant circuits to maximize their reliability and minimize their down time. Such fault tolerant circuits automatically detect faults in the system and return the system to proper operation without the need for manual repairs by a human operator.

For precise control of their timing, many electronic systems have fault tolerant clock circuits that use triple modular redundancy or three-way clock majority voting configurations. These fault tolerant clock circuits include three redundant clocks that are connected to a majority voter in which any one clock may become faulty without disrupting the operation of the system. In particular, the output of the majority voter corresponds to the input received from the majority of clocks that are in agreement. For example, U.S. Pat. No. 4,375,683 to J. H. Wensley, which issued on Mar. 1, 1983, provides a voter circuit that receives inputs from three computational devices and produces an output in agreement with a majority of the inputs. The voter circuit also includes a separate clock circuit that synchronizes the inputs to the three computational devices. Also, U.S. Pat. No. 4,683,570 to J. F. Bedard, et al., which issued on Jul. 28, 1987, provides a voter circuit that receives signals from three clocks and produces a majority voted output.

However, failure modes can occur with a clock circuit having a three-way clock majority voting configuration in which the voted clock edge may have spurious "sliver" components. Specifically, if one of the three voting clocks fails in an arbitrary way, a ragged edge may exist at the output of the voting circuit. The timing skew differential between the inputs from the clocks provides a window of opportunity for this sliver or ragged edge to appear. These sliver components or ragged edges compromise the precision and integrity of the clock circuit's output.

These sliver components could be cleaned up using a phase locked loop such as those provided in U.S. Pat. No. 5,377,205, which issued on Dec. 27, 1994; U.S. Pat. No. 5,377,206, which issued on Dec. 27, 1994; and U.S. Pat. No. 5,404,363, which issued on Apr. 4, 1995. These patents also provide a four-way clock majority voting configuration to produce a fault tolerant clock circuit. However, these designs are overly complicated and expensive to manufacture. In addition, the phase locked loops may introduce significant jitter which would eat into the cycle time.

Against the foregoing background, it is a primary object of the present invention to provide a fault tolerant clock circuit for high precision electronic circuits, such as computer systems, that provide high precision output and have a simple design.

It is another object of the present invention to provide such a fault tolerant clock circuit that eliminates sliver components without the need for complicated circuits that include a phase locked loop.

It is a further object of the present invention to provide such a fault tolerant clock circuit that eliminates sliver components without introducing significant jitter which would eat into the cycle time.

SUMMARY OF THE INVENTION

To accomplish the foregoing objects and advantages, the present invention is a fault tolerant clock system for a synchronous design using N-way combinatorial voting schemes for N greater than 3 which, in brief summary, comprises a plurality of clock circuits for generating clock signals and a voting circuit, namely a flip-flop, that is connected to each clock circuit for receiving the clock signals and generating an output signal. The voting circuit produces an output signal that is in agreement with a majority of the clock signals and maintains the output signal at a previous output level when the majority of the clock signals is not detected by the voting circuit. From another viewpoint, the voting circuit maintains the output signal at the previous current level when a minority of agreeing clock signals is not detected by the voting circuit.

BRIEF DESCRIPTION OF THE DRAWINGS

The foregoing and still further objects and advantages of the present invention will be more apparent from the following detailed explanation of the preferred embodiments of the invention in connection with the accompanying drawings:

FIG. 6 is a Karnaugh map of the normal output produced by the flip-flop of FIG. 5; and FIG. 7 is a Karnaugh map of the inverted output produced by the flip-flop of FIG. 5.

DETAILED DESCRIPTION OF THE PREFERRED EMBODIMENT

Figure 1:
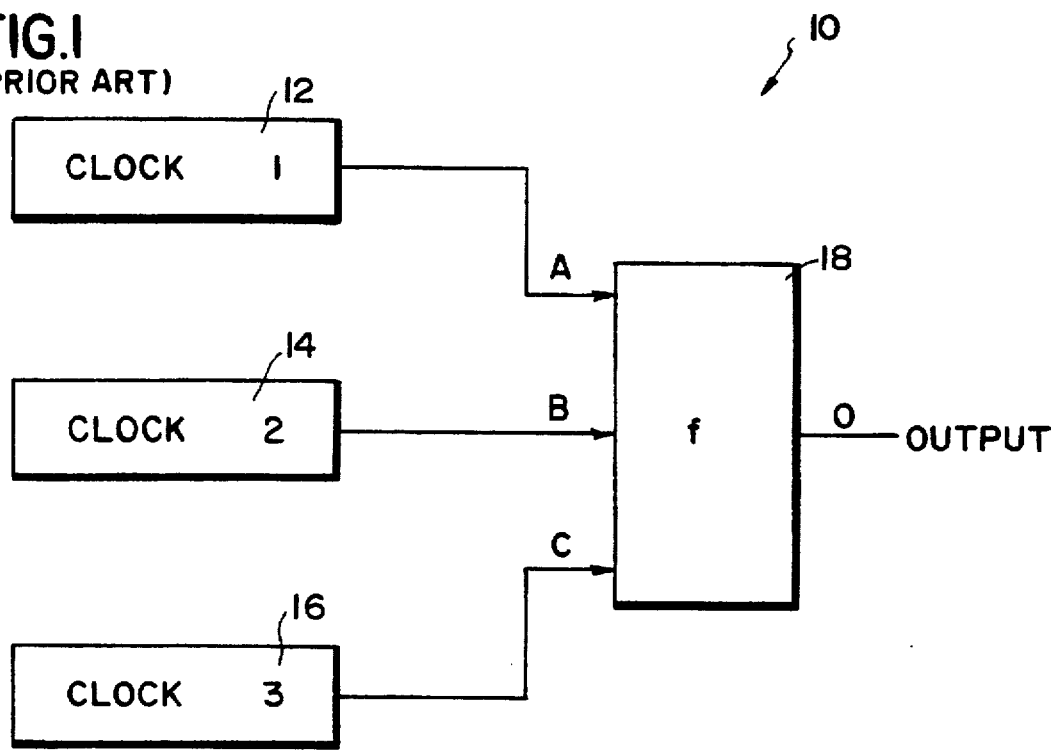
FIG. 1 is a block diagram of a prior art clock circuit.
Figure 2A:
FIG. 2A through 2D are timing diagrams for the prior art clock circuit of FIG. 1.
Figure 2B:
Figure 2C:
Figure 2D:

Referring to FIGS. 1 and 2A, 2B, 2C and 2D of the drawings, there is provides a typical clock circuit 10 of the prior art. As shown in FIG. 1, this prior art clock circuit 10 consists of three clocks 12, 14 & 16 that are connected to a voting circuit 18 to form a 3-way combinatorial majority voting scheme. Also, FIGS. 2A, 2B and 2C are timing diagrams representing three sample clock signals A, B and C from clock 12, clock 14 and clock 16, respectively, that are received by the voting circuit 18. Since the three clock signals A, B and C are not precisely in sync in a typical implementation, the voting circuit 18 synchronizes with the majority of these three clock signals to produce an output O shown in FIG. 2D. For example, the output O changes to a predetermined state only after at least two clock signals, namely A and B, have changed to that state.

One problem with the prior art clock circuit 10 is that the voted clock edge may have spurious sliver components or ragged edges that lead to system failure if one of the three voting clocks fails. In particular, an erratic clock signal would cause the output O of the voting circuit 18 to become a problem. In such event, the sliver components or ragged edges would occur within the timing skew differential between the inputs of the clock signals A, B and C.

Referring to FIGS. 3, 4A through 4F, 5, 6 and 7, there is provided a fault tolerant clock circuit of the preferred embodiment which is generally represented by reference numeral 20. This preferred clock circuit 20 uses a fault tolerant clock distribution scheme in which any one clock of the circuit may become faulty without disrupting its operation. The present invention uses more than three clocks in the voting scheme in order to solve the sliver component or ragged edge problem that is characteristic of the 3-way scheme.

Figure 3:
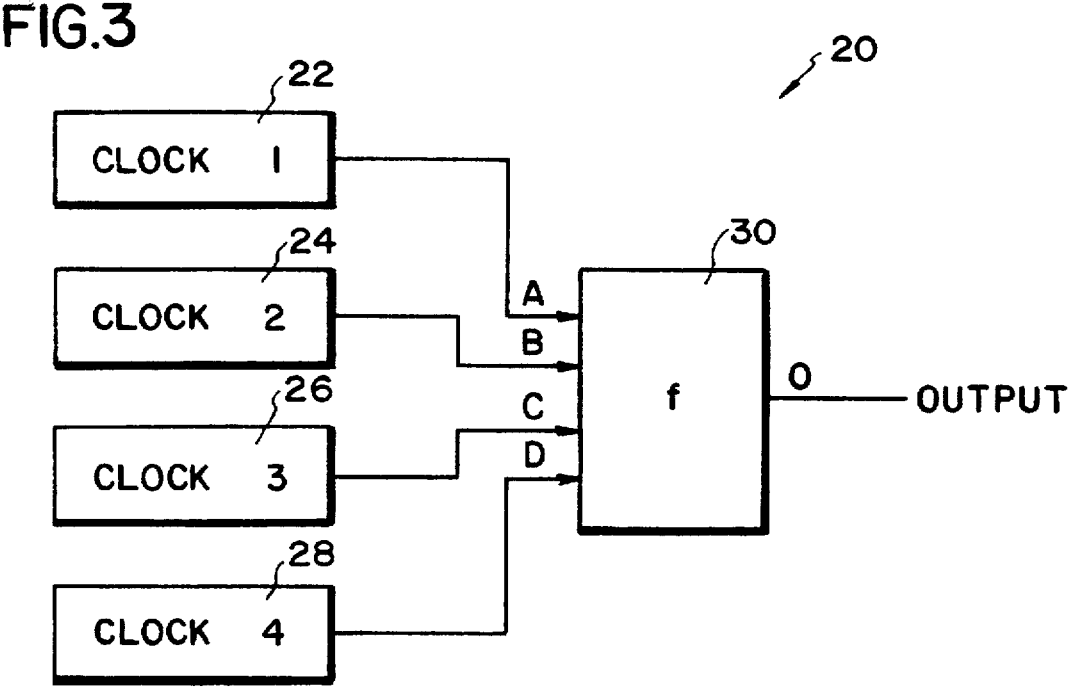
FIG. 3 is a block diagram of the preferred clock circuit in accordance with the present invention.

Referring to the preferred embodiment of FIG. 3, a majority voting technique for the clock distribution scheme is used by an R-S flip-flop 30 for four clocks 22, 24, 26 and 28. In particular, clocks 22, 24, 26 and 28 provide clock signals A, B, C and D, respectively, to the R-S flip-flop 30 so that the R-S flip-flop may produce the output O. The present invention provides for an N-way voting scheme in which N is greater than three. Accordingly, if one of the clocks 22, 24, 26 or 28 fails, then the remaining clocks will still provide the R-S flip-flop 30 with sufficient information, i.e. three or more clock signals, to produce a stable output O. Thus, a bad contributing clock can not cause an overall failure in the resulting clock output.

The preferred embodiment uses a 4-way voting scheme with an intervening R-S flip-flop prior to the resultant clock output. A majority high level vote by the clocks 22, 24, 26 and 28 will set the R-S flip-flop 30, and a majority low level vote by the clocks will clear the flip-flop.

When having an N-way voting scheme with an even number of clocks, such as the 4-way voting scheme of the preferred embodiment, the clock circuit 20 must determine the output O when a majority or minority of the clock signals A, B, C and D is not detected by the R-S flip-flop 30. For example, for the preferred embodiment shown in FIG. 3, clocks 22 and 24 may produce a binary "1" at the same time that clocks 26 and 28 produce a binary "0". In such event, the output O of the R-S flip-flop 30 must show a stable clock edge. Specifically, the output O must remain at its previous state until a majority vote is detected by the R-S flip-flop 30 or the output must immediately change its state and then remain at this state when a majority vote is detected. Accordingly, the output O of the R-S flip-flop 30 is used as the corrected clock output. A suitable majority high input sets the R-S flip-flop 30, while a majority low input resets the flip-flop. For example, if N=4, then three or more 1's must be present for the flip-flop to be set, while three or more 0's must be present for the flip-flop to be reset. Also, for the preferred embodiment, the RS flip-flop 30 does not change state if exactly two inputs are set or reset.

Figure 4A:
FIG. 4A through 4F are timing diagrams for the preferred clock circuit of FIG. 3.
Figure 4B:
Figure 4C:
Figure 4D:
Figure 4E:

The timing diagrams of FIGS. 4A through 4F illustrate the operation of the preferred clock circuit 20. FIGS. 4A through 4D represent sample clock signals A, B, C and D generated by clocks 22, 24, 26 and 28, respectively. FIG. 4E illustrates an erroneous output O' that may occur when the R-S flip-flop 30 of the present invention is not used. In particular, the output O' becomes erratic when a majority or minority vote is not detected and, thus, cause problems with components that are connected to this output.

Figure 4F:

Referring to FIG. 4F, there is shown the output O of the preferred embodiment shown in FIG. 3. The output O of the R-S flip-flop 30 remains at its previous state until a majority vote is detected by the flip-flop. The R-S flip-flop 30 is set when there are at least N-X "1" inputs, and reset when there are at least N-X "0" inputs. Preferably, X is "1" but other integer values, will also work, as long as (N-X)>(N/2).

Figure 5:
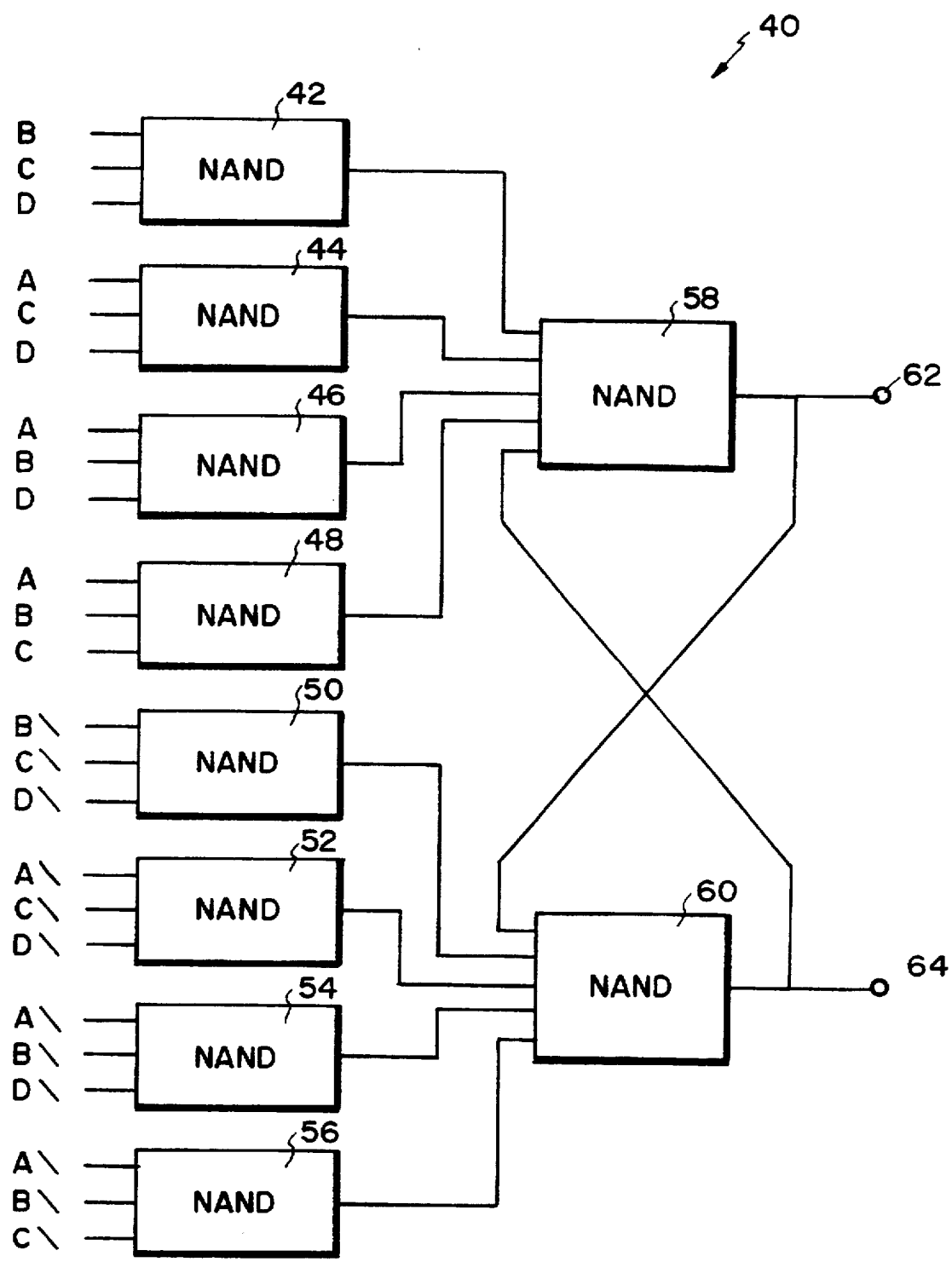
FIG. 5 is a logic diagram of the flip-flop of the preferred clock circuit of FIG. 3.

Referring to FIG. 5, there is shown a particular logic implementation of the R-S flip-flop 30 shown in FIG. 3. This implementation, designated 40, includes means for producing an output signal that is in agreement with a majority of the clock signals and means for maintaining the output signal at its previous or current output level when the majority of the clock signals is not detected by the flip-flop, as represented by the NAND gates shown in FIG. 5. In particular, a first tier of NAND gates 42, 44, 46, 48, 50, 52, 54 and 56 are connected to a second tier of NAND gates 58 and 60 in order to generate outputs 62 and 64 in which output 62 corresponds to output O of FIG. 3. Also, the inputs to NAND gates 50, 52, 54 and 56 are inverted relative to the inputs of NAND gates 42, 44, 46 and 48. It is to be understood that various implementations for R-S flip-flops are widely known in the art, and any of these implementations may be used for the present invention.

Figures 6, 7:
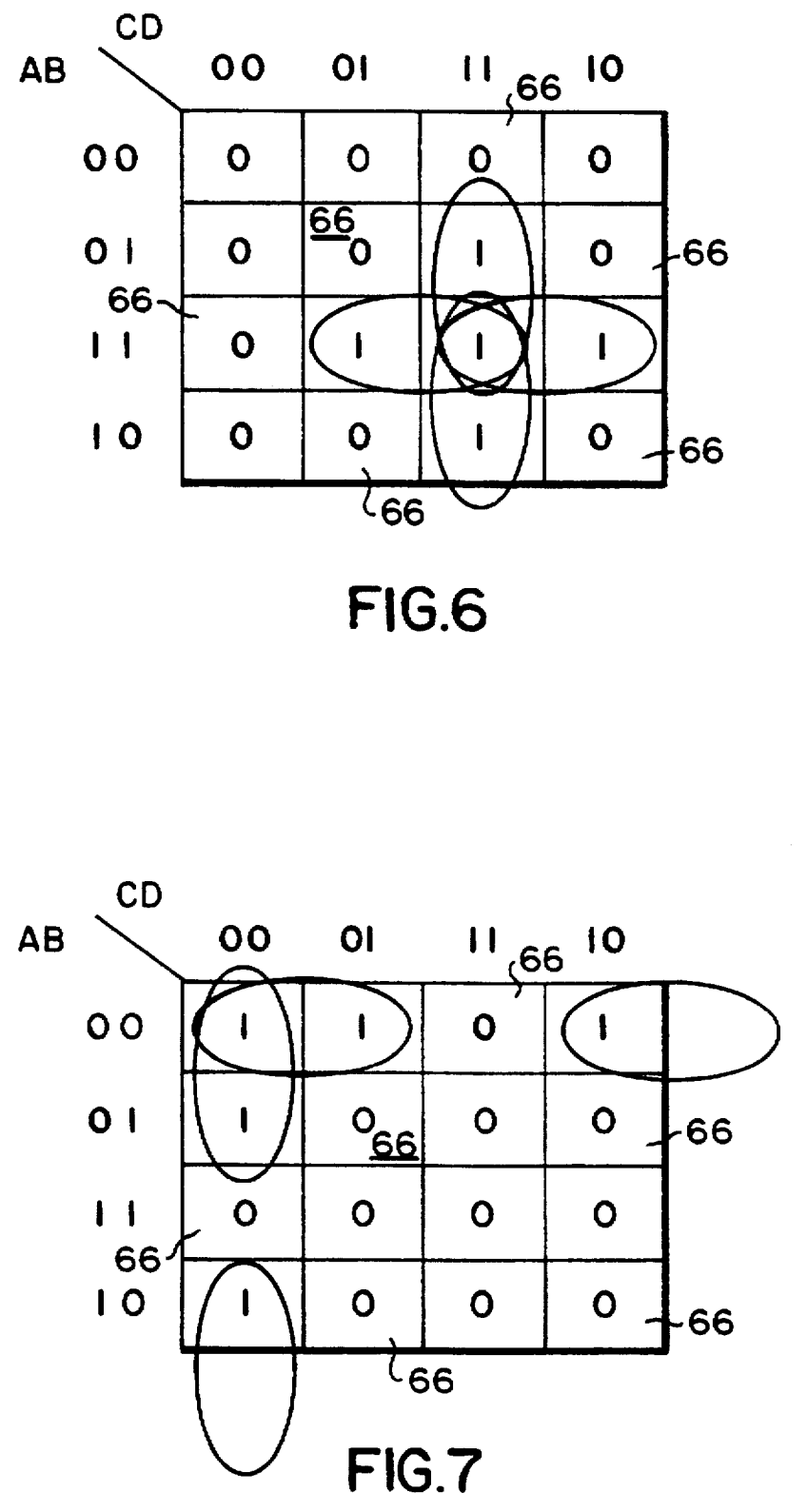

Referring to FIGS. 6 and 7, Karnaugh maps provide a convenient way of understanding the operation of the excitation functions to the R-S flip-flop 30 of FIG. 3. The inputs that indicate a majority vote have terms that are clustered together. Also, separation areas 66 between the high vote cluster shown in FIG. 6 and the low vote cluster shown in FIG. 7 represent situations where faulty clock lines are suppressed by the R-S flip-flop 30 so that they have no bearing on the overall clock output O.

The present invention having been thus described with particular reference to the preferred forms thereof, it will be obvious that various changes and modifications may be made therein without departing from the spirit and scope of the invention as defined in the appended claims.

What is claimed is:

1. A fault tolerant clock system for a synchronous design comprising:

at least four clock circuits for generating respective clock signals;

a voting circuit, connected to the four clock circuits, for producing an output signal having a first level when there is agreement among a majority of the clock signals, said voting circuit including a logic means having a first group of four inverting logic circuits each having three inputs which are connected to respective outputs of three different combinations of the four clock circuits and a second group of four inverting logic circuits each having three inputs which are connected to respective inverted outputs of the same three different combinations of the four clock circuits; and two additional inverting logic circuits, each having five inputs, four inputs thereof being connected to the outputs, respectively, of the first and second group of four inverting logic circuits, and each of the two additional inverting logic circuits having its output cross-coupled to the fifth input of the other inverting logic circuit.

2. A system as defined in claim 1, in which said voting circuit output signal has said first level and a previous output level, and wherein said previous output level is maintained until said majority of said clock signals is detected by said voting circuit.

* * * * *